US012762642B2

(12) United States Patent
Poosapalli et al.

(10) Patent No.: US 12,762,642 B2
(45) Date of Patent: Oct. 13, 2026

(54) CONTEXT AWARE PROTOCOL FOR SINGLE VIDEO MEMORY MAP

(71) Applicant: Dell Products L.P., Round Rock, TX (US)

(72) Inventors: Karunakar Poosapalli, Telangana (IN); Shekar Babu Suryanarayana, Bangalore (IN); Alankritha T V, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 18/650,152

(22) Filed: Apr. 30, 2024

(65) Prior Publication Data

US 2025/0336025 A1 Oct. 30, 2025

(51) Int. Cl.
*G06T 1/60* (2006.01)

(52) U.S. Cl.
CPC .................................... *G06T 1/60* (2013.01)

(58) Field of Classification Search
CPC ...................................................... G06T 1/60
USPC ........................................................ 345/531
See application file for complete search history.

(56) References Cited

U.S. PATENT DOCUMENTS

| | | | | |
|---|---|---|---|---|
| 10,867,655 | B1 * | 12/2020 | Harms | G11C 29/52 |
| 2021/0329306 | A1 * | 10/2021 | Liu | G06N 5/04 |
| 2022/0197651 | A1 * | 6/2022 | Kumar | G06F 9/3851 |

FOREIGN PATENT DOCUMENTS

| | | | |
|---|---|---|---|
| CN | 117097883 | * 10/2023 | H04N 17/00 |

* cited by examiner

*Primary Examiner* — Jin Ge

(74) *Attorney, Agent, or Firm* — Jackson Walker L.L.P.

(57) ABSTRACT

Disclosed systems and methods may be provisioned with various one video memory protocol features including, as non-limiting examples, an OEM-custom display layer to support protocols for context-based single video memory map and dynamic video rendering to boost the graphics rendering process for high-performance video/gaming experience when high-resolution displays are connected, context-based single video memory map protocol to create a sharable virtual video memory map, from different memory units, which can be utilized for effective video rendering and providing optimal gaming experience, a runtime adjustable video frame driver, referred to herein as an adjustable video frame driver to dynamically access the virtual video memory map according to the context present on the object interface.

10 Claims, 3 Drawing Sheets

CONTEXT AWARE PROTOCOL FOR SINGLE VIDEO MEMORY MAP

TECHNICAL FIELD

The present disclosure pertains to video rendering performance of information handling systems and, more particularly, systems featuring multiple video memory resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An original equipment manufacturer (OEM) of information handling systems may support many gaming platforms across different lines of business and multiple original design manufacturers (ODMs). Video RAM buffer and size plays a crucial role in graphics rendering and video performance. Video RAM capacity limitations may negatively impact core BIOS supported gaming platforms, potentially resulting in various types of negative end user experiences including any one or more of the following non-exhaustive examples:

If a game crashes before an end used has saved to a storage resource, the end user may be required to repeat a potentially lengthy sequence of gameplay just to reach the stage the user had reached prior to the crash.

Variations in the performance and end user experience for high resolution gaming applications across chipsets or platforms and, currently, there is no silicon-agnostic firmware support for tuning and optimizing gaming experience.

Replacing console systems broken or damaged due to thermal issues, which increases end user costs, cost to the customers.

Insufficient video buffer size resulting in sub-optimal graphics rendering, which is paramount in video games in gaming products. Currently, there is no available method to dynamically enumerate an extended virtual video memory buffer, sometimes referred to herein as a virtual video memory map, which can be shared for an improved user experience. When limited onboard Video Ram buffer or limited rendering capabilities Graphics cards are connected to a high-resolution gaming display, it will result in glitches, hangs, frame rate drops or crashes. A failure rate, 1/10 also creates a bad customer experience.

SUMMARY

Disclosed systems and methods may be provisioned with any one or more of various features including, as non-limiting examples:

- an OEM-custom display layer to support protocols for context-based single video memory map and dynamic video rendering to boost the graphics rendering process for high-performance video/gaming experience when high-resolution displays are connected;
- context-based single video memory map protocol to create a sharable virtual video memory map, from different memory units, which can be utilized for effective video rendering and providing optimal gaming experience;
- a runtime adjustable video frame driver, referred to herein as an adjustable video frame driver to dynamically access the virtual video memory map according to the context present on the object interface;
- a dynamic video rendering protocol to detect glitches, hangs and other improper refresh rate issues while sustaining advanced video rendering on high-performance devices to ensure optimal video output with support for custom graphics services such as setting video modes, block transfer etc.;
- silicon-agnostic firmware tuning protocol to enable optimal tuning for gaming experience.

Accordingly, the present application discloses a sharable virtual video memory map for effective video rendering in gaming products in combination with a context-based sliding video frame driver for utilizing the virtual video memory map for an improved gaming experience.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
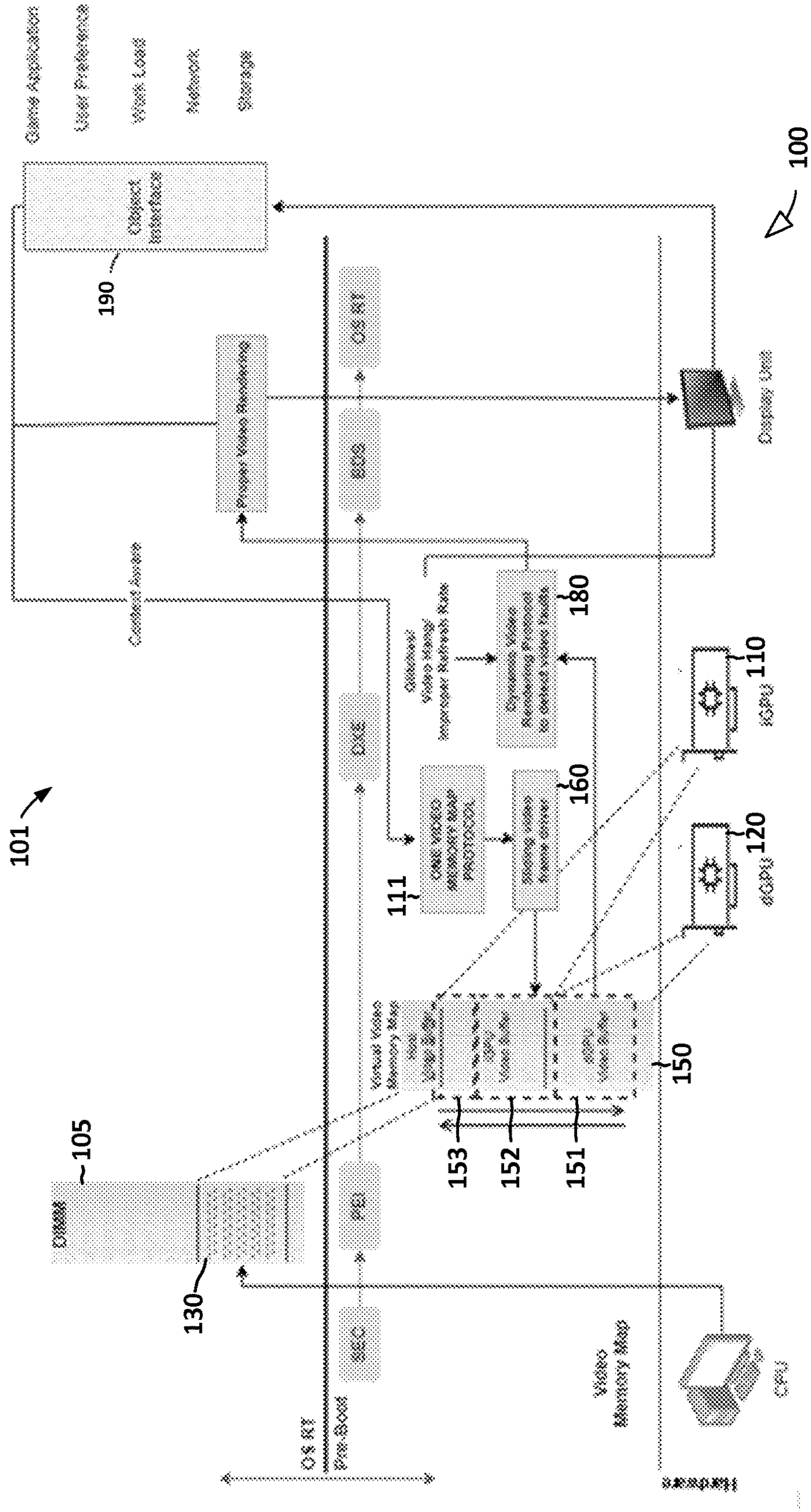
FIGS. 1 and 2 illustrate views of an information handling system platform featuring a one video memory map protocol module.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Disclosed systems and method implement protocols and core services disclosed herein at different stages of firmware and operating system.

Figure 2:
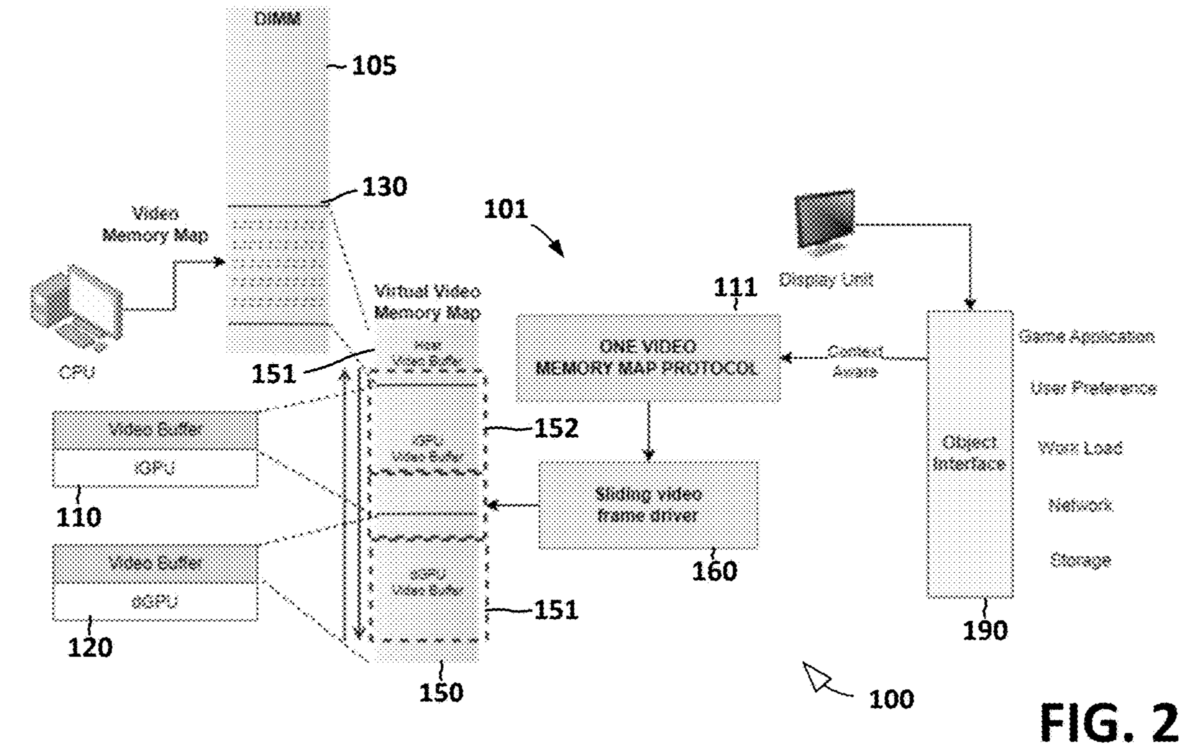

FIG. 1 and FIG. 2 illustrate views of a platform 101 for an information handling system 100 implementing a context-based protocol referred as a one video memory map (OVMM) protocol module 111 enabling access to and configuration of different graphics resources of an information handling system 100. Graphics resources depicted in FIG. 1 including an integrated GPU (iGPU) 110, a discrete GPU (dGPU) 120, and a host memory buffer 130 that comprises a portion of a system memory 105.

OVMM protocol module 111 includes, in part, firmware functionality for enumerating graphics resources of system 100. OVMM protocol module 111 may include services to parse the different GPU controllers and the different video frame buffers and sizes, as well as services suitable to dynamically create and allocate a shared or shareable virtual video memory buffer (VVMB) 150 encompassing a dGPU video buffer 151, an iGPU video buffer 152, and Host video buffer 153. OVMM protocol module 111 may generate and support VVMB 150 using host memory with services to pass the VVMB 150 to different system stages including both runtime and pre-boot stages including PEI, DXE, and SMM stages.

The OVMM protocol module 111 of FIG. 1 is illustrated coupled to a sliding video frame driver 160 to implement memory services for reading and reconfiguring the memory-mapped register based on VVMB 150 and/or context information 191 that is indicative of a context present on the object interface 190. Sliding video frame driver 160 to dynamically access the virtual video memory map Sliding video frame driver 160 may include or leverage monitoring services for sensing graphics metrics for usage and enumerating/rendering. When less than all of the available GPUs are being used, sliding video frame driver 160 may dynamically disconnect any unutilized GPU controller.

Figure 3:
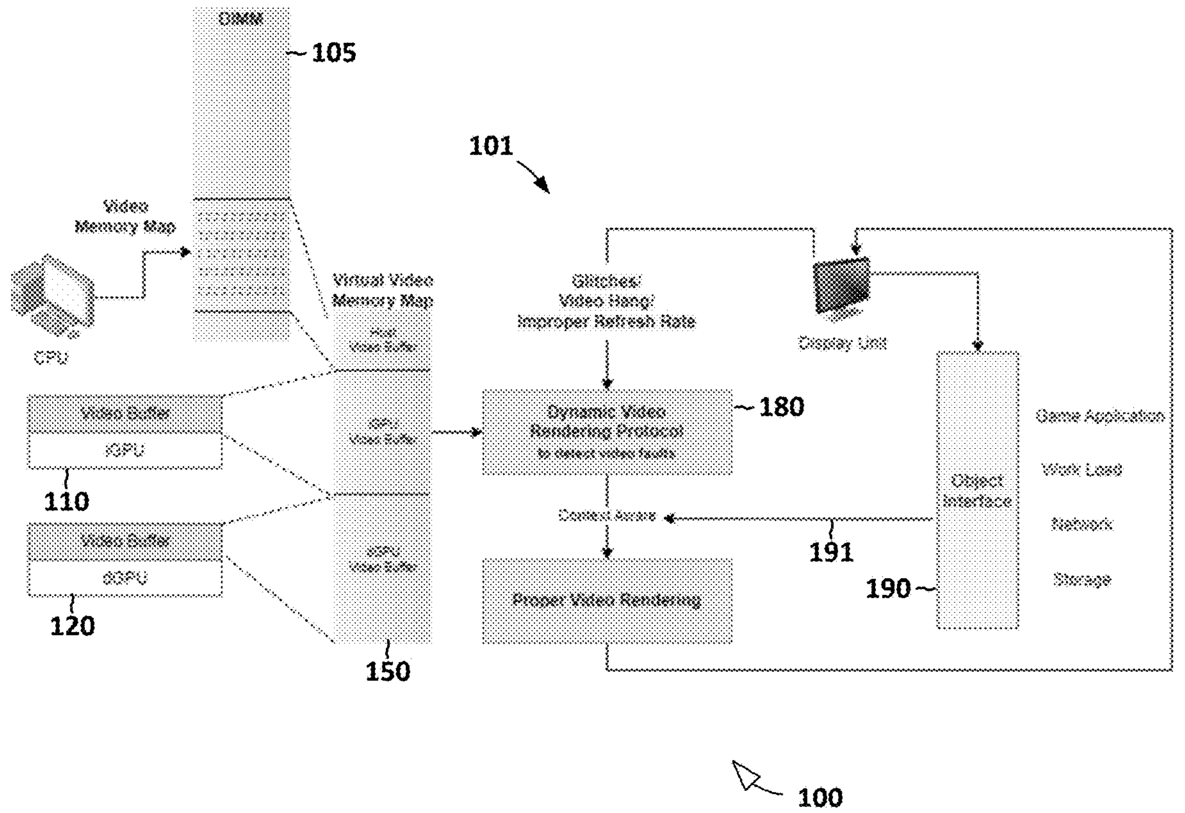
FIG. 3 illustrates a dynamic video rendering protocol suitable for use in the information handling system of FIG. 1.

FIG. 1 depicts a dynamic video rendering (DVR) protocol module 180, which is more clearly illustrated in FIG. 3. Turning to FIG. 3, DVR protocol module 180 may support an OS-exposed protocol and services to manage VVMB 150. DVR protocol module 180 may include protocol services to read VVMB 150. DVR protocol module 180 may also provide a custom graphics output protocol module with services to internally locate VVMB 150 and video rendering services with hybrid frame buffer features including Set Video modes, Block transfer etc. The DVR protocol module 180 may further include runtime service enabling the OS to write video data to the frame buffer until a graphics OS driver owns the graphics controller.

In at least one embodiment, an SoC-agnostic firmware tuning protocol workflow may capture a trace and analyze the trace to identify if a game is GPU-bound or CPU-bound. If the game is GPU-bound, the method branches to a capture step described below. If a game is CPU-bound, the method may branch to an analyze step below. In the capture step, a stream is captured to understand frame details. The captured stream or frame is analyzed to resolve GPU bottlenecks. In the analysis step, the game is analyzed for CPU bottlenecks and, if CPU bottlenecks are detected, critical CPU Bottlenecks are investigated to obtain deeper insights.

Figure 4:
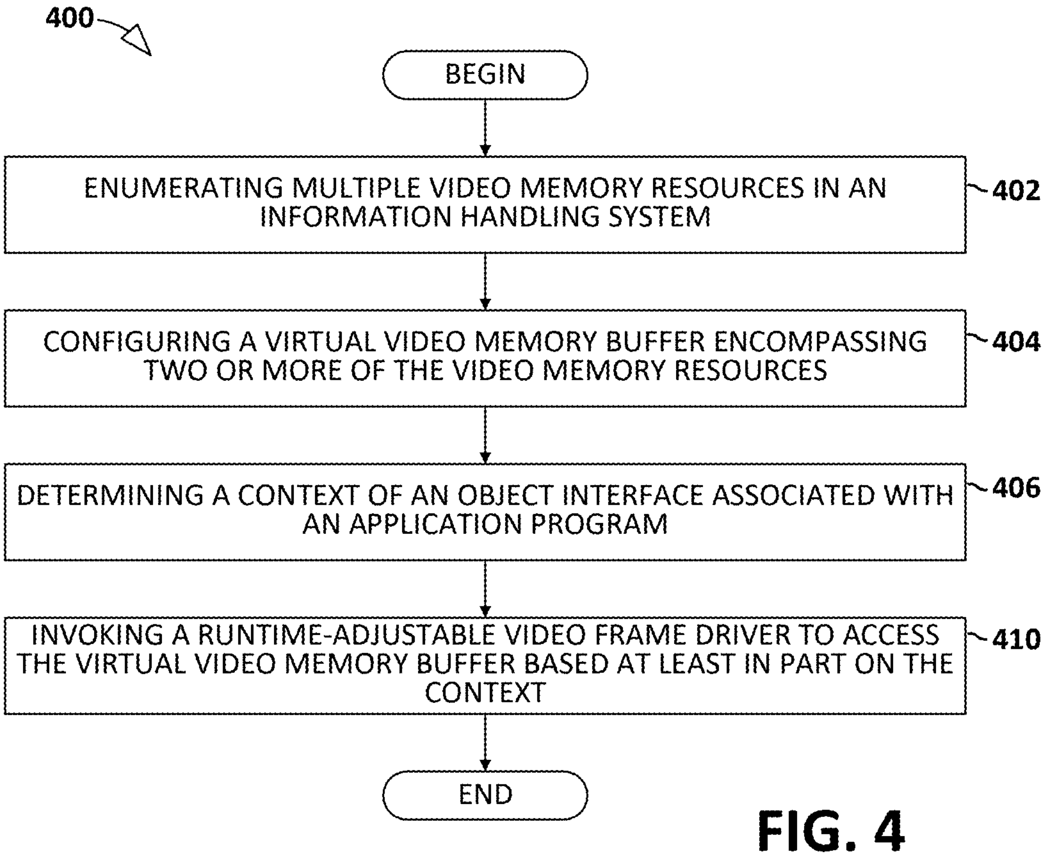
FIG. 4 illustrates a flow diagram of a method for implementing a virtual video memory map.

Referring now to FIG. 4, a flow diagram illustrates a method 400 for implementing a one virtual video memory buffer includes enumerating (step 402) multiple video memory resources, e.g., a dGPU, an iGPU, etc. in an information handling system and configuring (step 404) a virtual video memory buffer encompassing two or more of the video memory resources. A context of an object interface associated with an application program is determined (step 406) and a runtime-adjustable video frame driver is invoked (step 410) to access the virtual video memory buffer based at least in part on the context.

Figure 5:
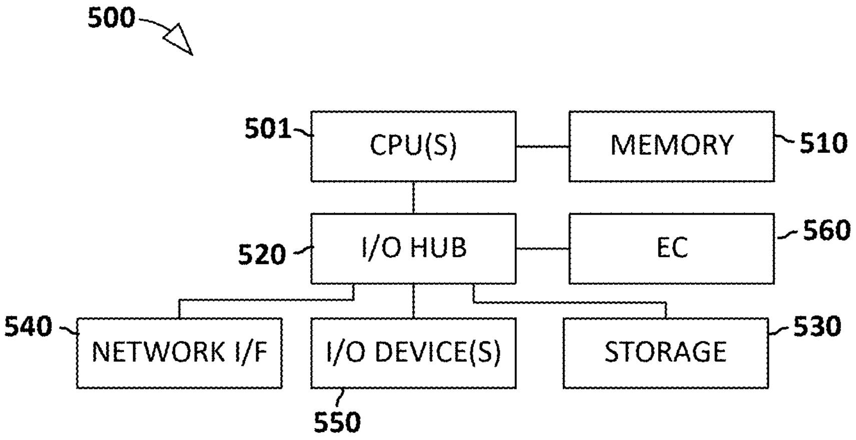
FIG. 5 illustrates an exemplary information handling system suitable for use in conjunction with disclosed methods and system.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc. The illustrated information handling system 500 includes an embedded controller EC 560 may provide or support various system management functions and, in at least some implementations, keyboard controller functions. Exemplary system management function that may be supported by EC 560 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 560 may support battery management features to control charging of the battery in addition to switching between the battery and AC adapter as the active power source changes or monitoring the various battery status metrics such as temperature, charge level and overall health. EC 560 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:

enumerating multiple video memory resources in an information handling system, wherein the multiple video memory resources comprise a video buffer of an integrated graphics processing unit (iGPU), a video buffer of a discrete graphics processing unit (dGPU), and a host video buffer;

configuring a virtual video memory buffer encompassing two or more of the video memory resources;

determining a context of an object interface associated with an application program, wherein the context comprises at least one of a game application, a user preference, a workload, a network, and a storage; and invoking a runtime-adjustable video frame driver to access the virtual video memory buffer based at least in part on the context, wherein invoking the runtime-adjustable video frame driver comprises:

reconfiguring one or more memory-mapped registers associated with the virtual video memory buffer based on the context; and responsive to the context indicating that one of the iGPU and dGPU is not in use, dynamically disconnecting a controller associated with the one of the iGPU and dGPU.

2. The method of claim 1, wherein the enumerating of the multiple video memory resources is performed during a pre-boot phase of the information handling system.

3. The method of claim 1, further comprising monitoring rendered Video for video faults.

4. The method of claim 3, wherein the video faults comprise refresh rate faults.

5. The method of claim 3, responsive to detecting a refresh rate issue, dynamically adjusting the virtual video memory buffer.

6. An information handling system comprising:

a central processing unit;

a memory including processor-executable instructions that, when executed by the processor, cause the system to perform operations including:

enumerating multiple video memory resources in an information handling system, wherein the multiple video memory resources comprise a video buffer of an integrated graphics processing unit (iGPU), a video buffer of a discrete graphics processing unit (dGPU), and a host video buffer;

configuring a virtual video memory buffer encompassing two or more of the video memory resources;

determining a context of an object interface associated with an application program, wherein the context includes at least one of a game application, a user preference, a workload, a network, and a storage; and invoking a runtime-adjustable video frame driver to access the virtual video memory buffer based at least in part on the context, wherein invoking the runtime-adjustable video frame driver comprises:

reconfiguring one or more memory-mapped registers associated with the virtual video memory buffer based on the context; and responsive to the context indicating that one of the iGPU and dGPU is not in use, dynamically disconnecting a controller associated with the one of the iGPU and dGPU.

7. The information handling system of claim 6, wherein the enumerating of the multiple video memory resources is performed during a pre-boot phase of the information handling system.

8. The information handling system of claim 6, further comprising monitoring rendered video for video faults.

9. The information handling system of claim 8, wherein the video faults comprise refresh rate faults.

10. The information handling system of claim 8, responsive to detecting a refresh rate issue, dynamically adjusting the virtual video memory buffer.

* * * * *